US008295896B2

(12) United States Patent
Jeon

(10) Patent No.: US 8,295,896 B2
(45) Date of Patent: Oct. 23, 2012

(54) WATERPROOF COVER FOR MOBILE PHONE

(75) Inventor: Hyoung Jin Jeon, Daegu (KR)

(73) Assignee: Mayplus Co., Ltd., Seoul (KR)

( * ) Notice: Subject to any disclaimer, the term of this patent is extended or adjusted under 35 U.S.C. 154(b) by 0 days.

(21) Appl. No.: 13/028,450

(22) Filed: Feb. 16, 2011

(65) Prior Publication Data

US 2011/0312394 A1 Dec. 22, 2011

(30) Foreign Application Priority Data

Jun. 18, 2010 (KR) ........................ 10-2010-0057855
Sep. 6, 2010 (KR) ........................ 10-2010-0087094

(51) Int. Cl.
*H04M 1/00* (2006.01)
*G03B 17/08* (2006.01)

(52) U.S. Cl. .......................... 455/575.1; 396/27; 396/29

(58) Field of Classification Search ............... 455/575.8, 455/350; 156/89.12; 361/679.26, 752, 757; 396/27, 29, 535; 206/320, 305
See application file for complete search history.

(56) References Cited

U.S. PATENT DOCUMENTS 6,082,535 A 7/2000 Mitchell
6,273,252 B1 8/2001 Mitchell
D447,622 S 9/2001 Weinstock
D489,180 S 5/2004 Kramer
D553,851 S 10/2007 MacAuley
7,496,195 B2 2/2009 Kramer
2003/0111366 A1 6/2003 Enners
2005/0134576 A1* 6/2005 Lin et al. ........................ 345/173
2008/0081679 A1* 4/2008 Kawasaki et al. .......... 455/575.8
2008/0083631 A1 4/2008 Tsang et al.

FOREIGN PATENT DOCUMENTS

JP U3073367 11/2000
JP 2000-341383 12/2000
JP 2002-320511 11/2002
JP 2004136044 5/2004
JP 2006-280388 10/2006
KR 30-0257506 5/2000
KR 20-0227351 6/2001
KR 2001-0105868 11/2001
KR 20-0313753 5/2003
KR 30-0487875 4/2008

(Continued)

OTHER PUBLICATIONS

Trial Decision of Intellectual Property Tribunal 7th Division dated Dec. 29, 2011 for Invalidation of Korean Patent No. 1018410 entitled "Waterproof Cover for Mobile Phone".

(Continued)

*Primary Examiner* — Kiet Doan
(74) *Attorney, Agent, or Firm* — Lowe Hauptman Ham & Berner, LLP

(57) ABSTRACT

A waterproof cover for a mobile phone including: a cover body having the same outward appearance as a mobile phone to accommodate the mobile phone therein, the cover body being made of polyurethane in such a way that the cover body is in a close contact with the mobile phone to be accommodated therein, the cover body having a receiving hole formed on a front face of the cover body for allowing the mobile phone to be inserted into and removed from the cover body; and an adhesive member being continuously releasably-adhered on the front face of the cover body to seal and open the receiving hole.

2 Claims, 18 Drawing Sheets

FOREIGN PATENT DOCUMENTS

| KR | 1020090081075 | 7/2009 |
|---|---|---|
| KR | 10-1027766 | 4/2011 |
| KR | 30-0629273 | 2/2012 |

OTHER PUBLICATIONS

Trial Decision of Intellectual Property Tribunal 7th Division dated Dec. 29, 2011 for Confirmation Trial on Scope of Right of Korean Patent No. 1018410 entitled "Waterproof Cover for Mobile Phone".
Aquashield Style; "http://www.widpin.com/insiter.php?design_file=34008.php" web-posted by WIDPIN, Seoul, Republic of Korea.
Aquashield Waterproof Full Body Protective Film; "http://www.wirelessemporium.com//p-98432-aquashield-waterproof-full-body-protective-film-for-apple-ip-.asp#" web-posted by Wireless Emporium Inc., Orange, CA.
Universal Waterproof Case; Manufactured by Krusell; "http://www.amazon.com/Krusell-SEaLABox-Universal-WaterProof-SmartPhones/dp/B004YIZY1E" web-posted by Amazon.com, Inc.
Amphibian Waterproof Case; "http://www.innopocket.com/product.php?productid=16350&cat=0&page=1" web-posted by InnoPocket.com, Kwai Chung, Hong Kong.
Universal Waterproof Case; "http://www.designbuzz.com/10-waterproof-cases-protect-cellphone.html" web-posted by DesignBuzz.
IPhone Waterproof Case—PhoneDome; Manufactured by Design Tong Co., Ltd.; "http://www.youtube.com/watch?v=9llmR5CFRkE" web-posted by YouTube, LLC, San Bruno, CA, USA.
iOttie Waterproof Skin for iPhone; "http://iottie.com/Product/ProductDetail.aspx?ProductID=799&ProductType=320" web-posted by iOttie, Inc., Hackensack, NJ.
Pre-Examination Search Report conducted Mar. 16-19, 2012.

* cited by examiner

WATERPROOF COVER FOR MOBILE PHONE

BACKGROUND OF THE INVENTION

1. Field of the Invention

The present invention relates to a waterproof cover for a mobile phone, which can protect a mobile phone against water, and more particularly, to a waterproof cover for a mobile phone, which includes: a cover body with the same form as the mobile phone, the cover body being made of polyurethane with flexibility and having a receiving hole for promoting accommodation of the mobile phone; and an adhesive member for sealing and opening the receiving hole, wherein the cover body is in a close contact with the mobile phone accommodated therein and has an embossed pattern, and wherein the waterproof cover further includes a transparent member made of a transparent material and formed at a portion where a camera of the mobile phone accommodated in the cover body is located.

2. Background Art

In general, mobile phones are devices, which allow user to make and receive telephone calls to and from other mobile phones and fixed-line phones. Recently, the mobile phones are necessities of modern people because they can realize various functions, such as a music playback, a camera function, a DMB function, Internet search, and so on.

In order to perform such various functions, each of the mobile phones embeds electronic boards, electric circuits, and so on therein. Accordingly, if there is an inflow of water into the mobile phone, water causes the electronic boards and the electric circuits to corrode, and the internal parts of the mobile phone are damaged due to overvoltage when electric currents are applied to the electronic boards and the electric circuits in a wet state of the electronic boards and the electric circuits.

Therefore, the mobile phone has several problems in that a mobile phone user cannot use the mobile phone in swimming pools or beaches in safety, and in that the mobile phone is necessarily broken down when the mobile phone is dropped into water through the user's carelessness.

In order to overcome the problems of the mobile phone, recently, waterproof devices for waterproofing of mobile phones have been continuously developed. Most of the waterproof devices include a case made of vinyl for accommodating a mobile phone therein, and opening and closing means disposed on one side of the case for sealing the inside of the case. Accordingly, the user can carry the mobile phone by accommodating the mobile phone into the case and locking the opening and closing means to protect the mobile phone against the outside, so that it can protect the mobile phone against water even though the user uses the mobile phone in a swimming pool or a beach or drops it into water.

However, such a waterproof device has several problems in that it lacks practicality because it is focused only to the waterproof function and is not easy to carry, and in that users avoid use of the waterproof device because it is not designed for a design of the mobile phone.

Moreover, the waterproof device has another problem in that the waterproof device made of vinyl cannot perform its waterproof function and is not effective because it tears easily and water flows into the torn area when it rubs against the floor of the swimming pool or beach or is scratched to a sharp structure or because water flows through the opening and closing means and permeates the mobile phone inside the waterproof device when the waterproof device is put in water for a long time.

SUMMARY OF THE INVENTION

Accordingly, the present invention has been made to solve the above-mentioned problems occurring in the prior arts, and it is an object of the present invention to provide a waterproof cover for a mobile phone, which includes: a cover body with the same form as the mobile phone, the cover body being made of polyurethane with flexibility and having a receiving hole for promoting accommodation of the mobile phone; and an adhesive member for sealing and opening the receiving hole, wherein the cover body is in a close contact with the mobile phone accommodated therein and has an embossed pattern, and wherein the waterproof cover further includes a transparent member made of a transparent material and formed at a portion where a camera of the mobile phone accommodated in the cover body is located, whereby it can enhance a waterproof effect for the mobile phone by preventing an inflow of water into the cover body, allow the mobile phone to be easily inserted into the waterproof cover because the cover body does not stick to the mobile phone due to the embossed pattern, and allow the mobile phone accommodated therein to perform its camera function because the camera of the mobile phone can take an outside image through the transparent member.

To accomplish the above object, according to the present invention, there is provided a waterproof cover for a mobile phone including: a cover body having the same outward appearance as a mobile phone to accommodate the mobile phone therein, the cover body being made of polyurethane in such a way that the cover body is in a close contact with the mobile phone to be accommodated therein, the cover body having a receiving hole formed on a front face of the cover body for allowing the mobile phone to be inserted into and removed from the cover body; and an adhesive member being continuously releasably-adhered on the front face of the cover body to seal and open the receiving hole.

Moreover, the waterproof cover further includes an expansion member formed on the edge of a rear face of the adhesive member in such a way that the adhesive member is expanded outward to thereby seal and open the receiving hole, the expansion member being made of a film material continuously releasably-adhered onto the edge of the receiving hole of the cover body.

Furthermore, the receiving hole includes: curved portions, each of which is curved inwardly; and expanded portions of a round shape formed at portions where the curved portions meet with each other.

Additionally, in another aspect of the present invention, there is provided a waterproof cover for a mobile phone including: a cover body having a space for accommodating a mobile phone therein, an embossed intaglio pattern for preventing that the cover body sticks fast to the surface of the mobile phone when the mobile phone is accommodated into the cover body, a transparent member formed at a portion where a camera of the mobile phone accommodated therein is located to allow the camera to take an outside image through the transparent member, a receiving hole formed on a front face of the cover body to allow the mobile phone to be inserted into or removed from the cover body; and an adhesive member being continuously releasably-adhered on the receiving hole of the cover body to seal and open the receiving hole.

In a further aspect of the present invention, there is provided a waterproof cover for a mobile phone including: a cover body having a space for accommodating a mobile phone therein, an embossed intaglio pattern for preventing that the cover body sticks fast to the surface of the mobile phone when the mobile phone is accommodated into the cover body, a camera hole formed at a portion where a camera of the mobile phone accommodated therein is located to allow the camera to take an outside image through the transparent member, a receiving hole formed on a front face of the cover body to allow the mobile phone to be inserted into or removed from the cover body; a transparent member made of a transparent material and having an introducing hole of the same shape as the receiving hole of the cover body in such a way as to allow the mobile phone to be inserted into and removed from the transparent member in the same way as the cover body, the transparent member being sewed onto the front face of the cover body; and an adhesive member being continuously releasably-adhered on the introducing hole of the transparent member to seal and open the introducing hole.

Moreover, the receiving hole of the cover body and the introducing hole of the transparent member respectively include: curved portions curved inwardly; and expanded portions of a round shape formed at portions where the curved portions meet with each other, and have the same shape.

As described above, because the cover body for accommodating the mobile phone therein is made of polyurethane and the adhesive member is continuously releasably-adhered onto the cover body, the mobile phone is easily inserted into the cover body since the cover body is flexibly expanded and the receiving hole is widened due to flexibility of polyurethane, and the mobile phone is accommodated into the cover body without any gap between the mobile phone and the cover body and the adhesive member is adhered on the front face of the cover body to seal the receiving hole, so that it can effectively prevent the inflow of water into the cover body and stably waterproof the mobile phone accommodated in the cover body.

Moreover, because the adhesive member has an expansion member of a film material continuously releasably-adhered onto the receiving hole of the cover body is disposed on the edge of the rear face of the adhesive member, the adhesive member can enhance sealability for the receiving hole due to flexibility of the film material to thereby effectively prevent the inflow of water into the cover body.

Furthermore, because the receiving hole includes the curved portions curved inwardly and expanded portions of a round shape formed at portions where the curved portions meet with each other, an adhered area between the adhesive member and the front surface of the cover body is as wide as the curved form of the curved portions, and hence, the cover body can be sealed in more safety and the mobile phone can be easily inserted into the cover body since the expanded portions are expanded when the user applies power to the cover body.

Additionally, because the cover body has the embossed pattern and the transparent member made of a transparent material is formed at the portion where the camera of the mobile phone accommodated in the cover body is located, the mobile phone can be easily inserted into the cover body since the cover body does not stick to the mobile phone accommodated therein due to the embossed pattern, and the waterproof cover can allow the mobile phone accommodated therein to perform its camera function since the camera of the mobile phone can take an outside image through the transparent member.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Reference will be now made in detail to the preferred embodiment of the present invention with reference to the attached drawings.

Figure 1:
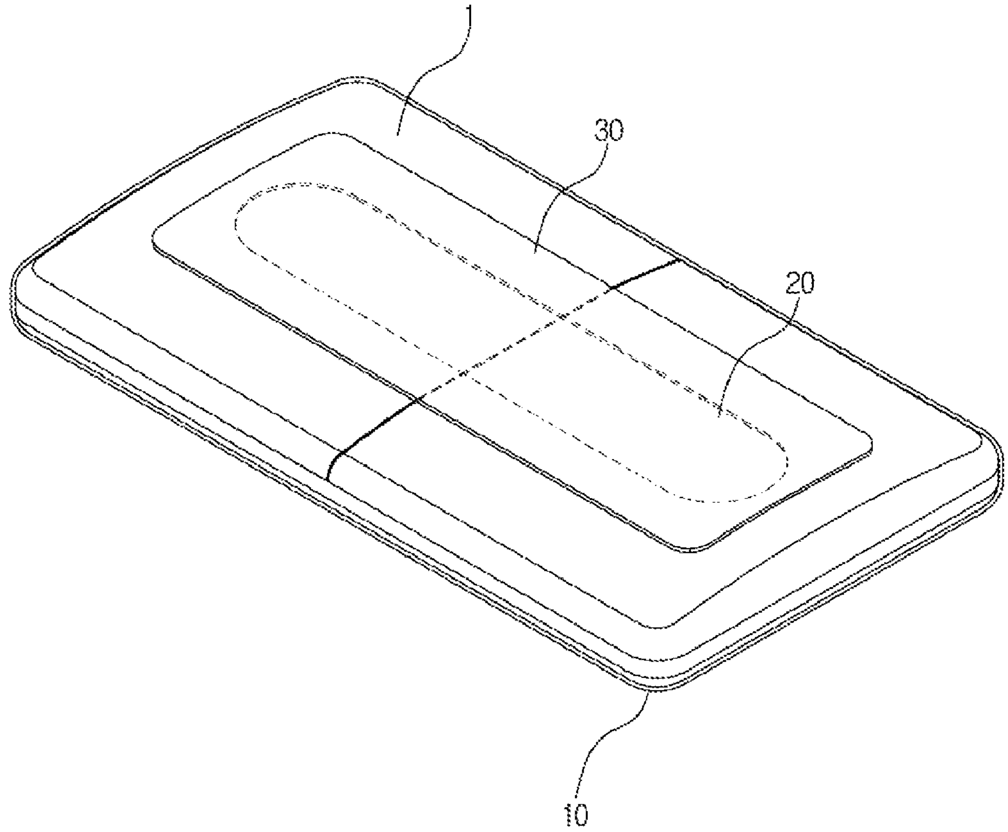
FIG. 1 is a view showing a preferable form of a waterproof cover for a mobile phone according to a first preferred embodiment of the present invention.
Figure 2A:
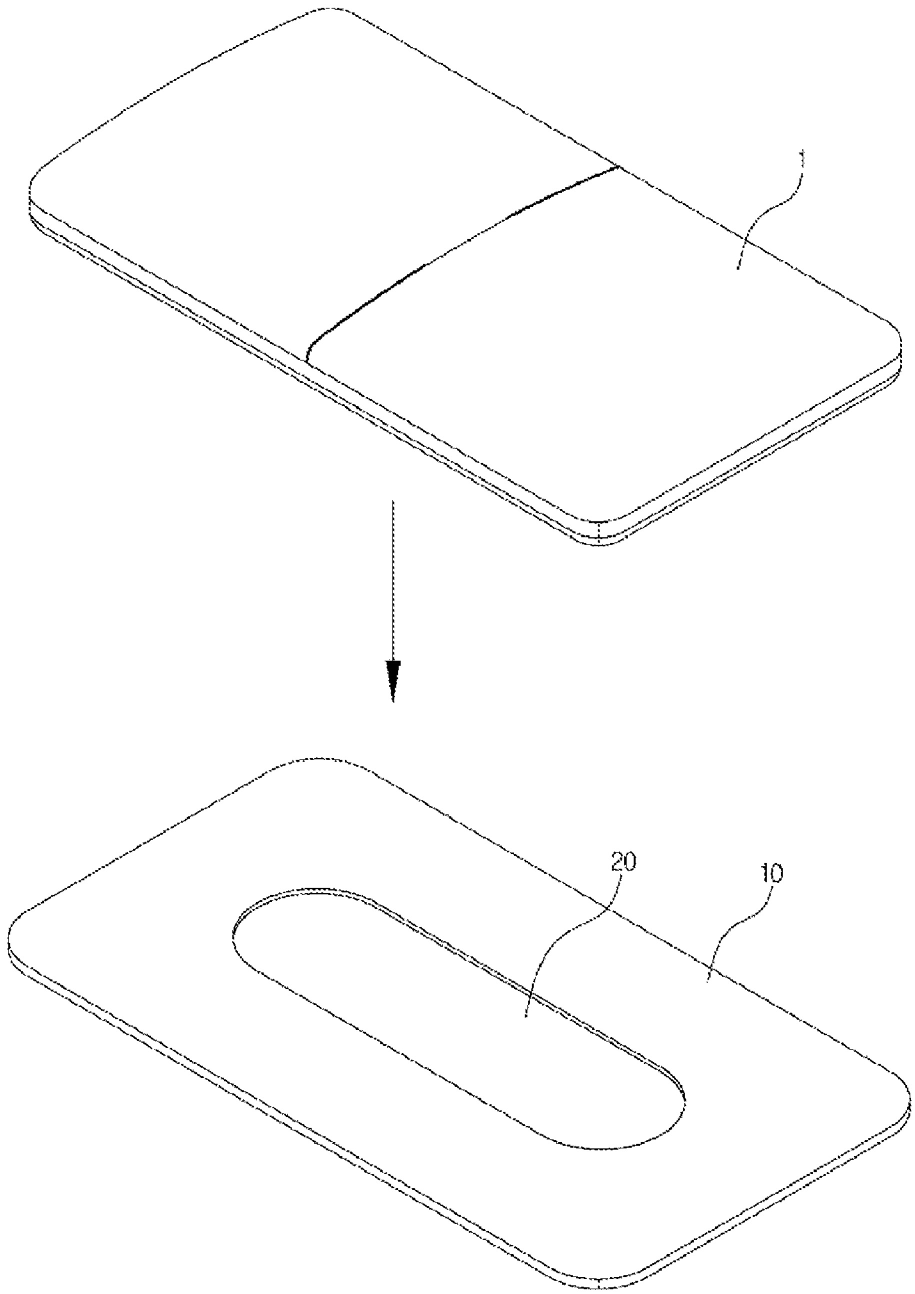
FIGS. 2*a*, 2*b* and 2*c* are perspective views showing preferable forms that a mobile phone is accommodated into the waterproof device according to the first preferred embodiment of the present invention.
Figure 2B:
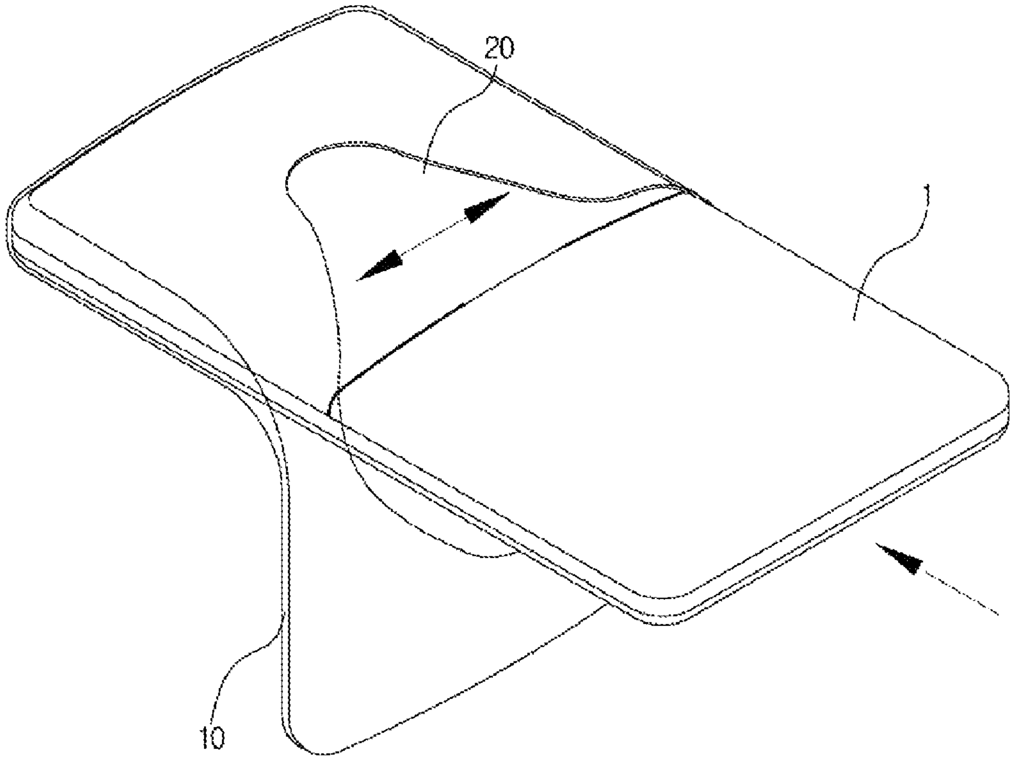
Figure 2C:
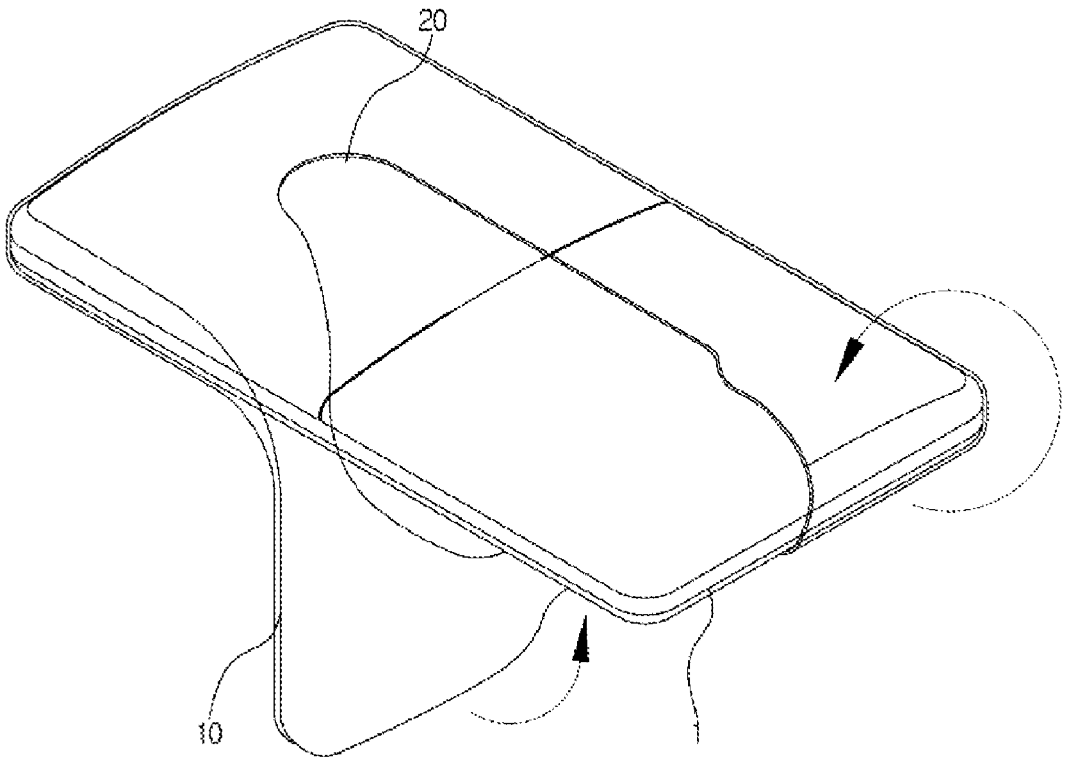
Figure 3:
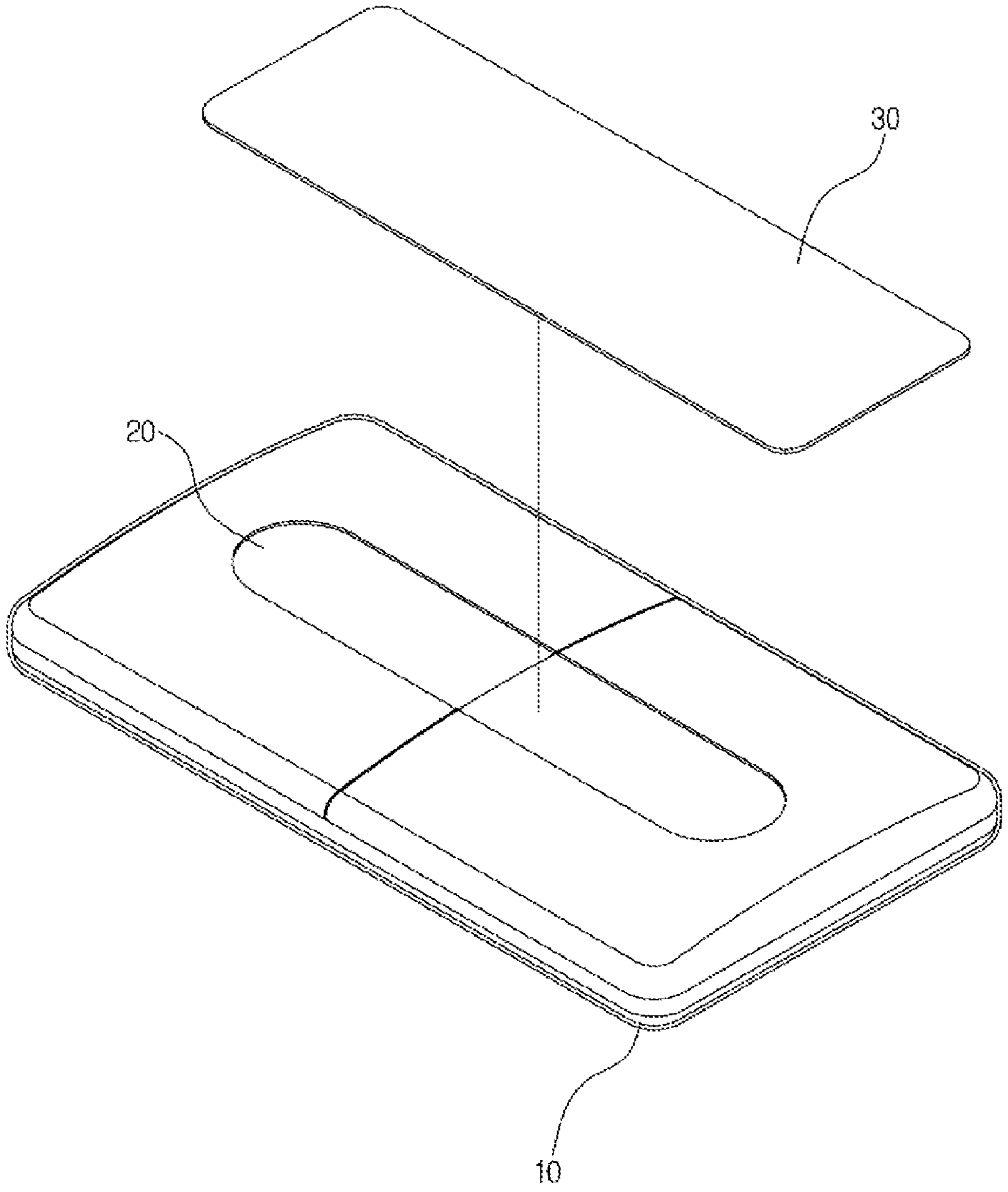
FIG. 3 is a view showing a preferable form that an adhesive member is adhered on a cover body, in which the mobile phone is accommodated, according to the first preferred embodiment of the present invention.

FIG. 1 is a view showing a preferable form of a waterproof cover for a mobile phone according to a first preferred embodiment of the present invention, FIGS. 2*a*, 2*b* and 2*c* are perspective views showing preferable forms that a mobile phone is accommodated into the waterproof device according to the first preferred embodiment of the present invention, and FIG. 3 is a view showing a preferable form that an adhesive member is adhered on a cover body, in which the mobile phone is accommodated, according to the first preferred embodiment of the present invention. The waterproof cover for a mobile phone according to the present invention is generally made of a waterproof material to prevent an inflow of water into the mobile phone when the mobile phone is put into water.

The waterproof cover for the mobile phone according to the present invention will be described in first and second preferred embodiments. The waterproof cover for mobile phone according to the first preferred embodiment of the present invention, as shown in FIGS. 1 to 3, includes a cover body 10 for accommodating a mobile phone 1 therein and an adhesive member 30 for sealing the cover body 10.

The cover body 10 has a space of the same appearance as the mobile phone 1, which will be accommodated in the cover body 10, and is made of polyurethane to firmly seal the mobile phone 1. The cover body 10 includes a receiving hole 20 formed on a front face thereof for allowing the mobile phone 1 to be inserted into and removed from the waterproof cover.

The adhesive member 30 can be releasably adhered onto the front face of the cover body 10 to promote sealing or opening of the receiving hole 20. In more detail, the adhesive member 30 is designed in such a way that one side of the adhesive member 30 is fixed to the cover body 10 and the other side is releasably adhered onto the cover body 10 to open and close the receiving hole 20.

Accordingly, in order to insert the mobile phone into the waterproof cover, after the adhesive member 30 is released from the cover body 10 to open the receiving hole 20, one side of the mobile phone 1 is inserted into the receiving hole 20 till an end portion of the mobile phone 1 is located at an end portion of the cover body 10. After that, the other side of the mobile phone 1 is inserted into the receiving hole 20 till the other end portion of the mobile phone 1 is located at the other end portion of the cover body 10, so that the mobile phone 1 is completely accommodated into the cover body 10.

In this instance, because the cover body 10 is made of polyurethane, the receiving hole 20 is widely expandable and the cover body 10 has elasticity, and hence, the mobile phone 1 can be easily inserted into the waterproof cover according to the present invention.

Furthermore, referring to FIGS. 2*a* and 2*b*, how to accommodate the mobile phone 1 into the cover body 10 through the receiving hole 20 will be described as follows. First, broaden the receiving hole 20 of the cover body 10 after grasping both sides thereof, insert and push the end portion of one side of the mobile phone 1 into the receiving hole 20 till it is accommodated into one side of the receiving hole 20, and then, restore the receiving hole 20 to its original state, so that the one side of the mobile phone 1 inserted into the receiving hole 20 is accommodated into the one side of the receiving hole 20.

After the one side of the mobile phone is accommodated into the side of the receiving hole 20, as shown in FIG. 2*c*, insert the other side of the mobile phone 1 into the other side of the receiving hole 20 till it is accommodated into the other side of the receiving hole 20, and then, pull the cover body 10, so that the mobile phone 1 can be completely accommodated into the cover body 10.

Moreover, after the mobile phone 1 is accommodated in the cover body 10, the adhesive member 30 is adhered on the front face of the cover body 10 to seal the receiving hole 20.

The cover body 10 made of polyurethane can express a design of the mobile phone 1 as it is because it presses against the accommodated mobile phone 1, and enhance practicality because it is easy to carry. Additionally, the cover body 10 can effectively seal the mobile phone 1 and prevent the inflow of water into the cover body 10 because there is no gap between the mobile phone 1 and the cover body 10, so that it can effectively protect the mobile phone 1 against water.

In addition, it is preferable that a rear surface of the adhesive member 30 is coated with an adhesive, so that the adhesive member 30 is continuously releasably-adhered onto the cover body 10. However, because the adhesive, which is continuously releasably-adhered, is a well-known technology, its detailed description will be omitted.

Furthermore, the adhesive member 30 is made of polyurethane like the cover body 10, and hence, it is in a close contact with the cover body 10 when it covers the receiving hole 20, whereby it can enhance sealability of the waterproof cover more.

Figure 4:
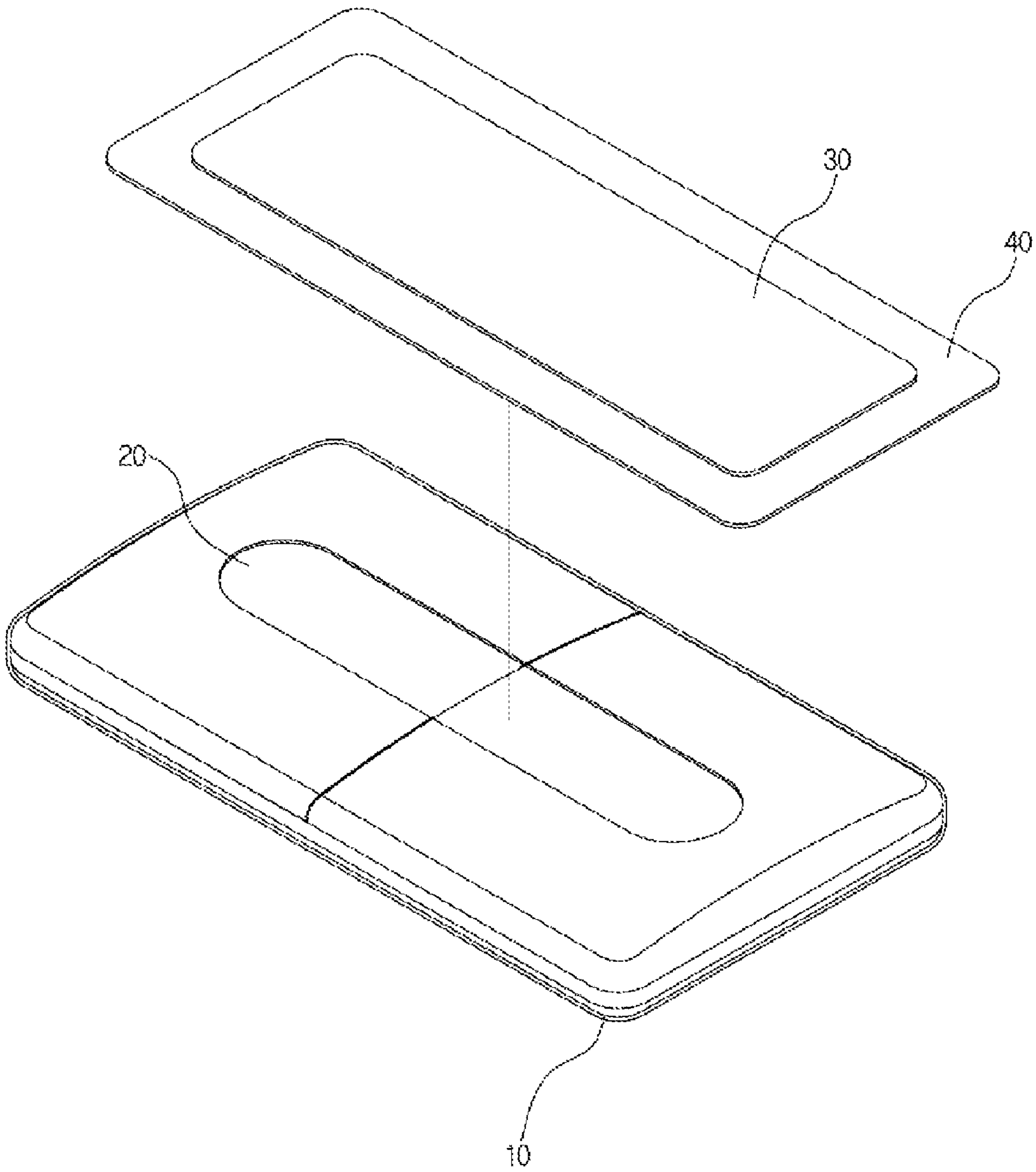
FIG. 4 is a view showing a preferable form that an expansion member is formed on the adhesive member and adhered on the cover body according to the first preferred embodiment of the present invention.
Figure 5:
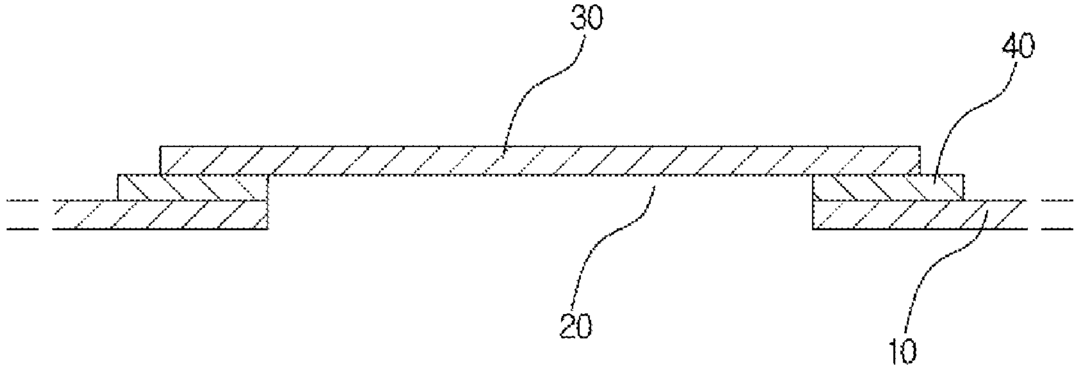
FIG. 5 is a sectional view showing the preferable form that the expansion member is formed on the adhesive member and adhered on the cover body according to the first preferred embodiment of the present invention.

As shown in FIGS. 4 and 5, an expansion member 40 is formed on the edge of the rear face of the adhesive member 30 in such a way that the adhesive member 30 is expanded outward to thereby seal and open the receiving hole 20, and is made of a film material releasably adhered onto the edge of the receiving hole 20 of the cover body 10.

When the expansion member 40 is adhered on the cover body 10, the receiving hole 20 of the cover body 10 is more firmly sealed due to the inherent flexibility of the film material, whereby the expansion member 40 can effectively prevent the inflow of water into the cover body 10.

Moreover, it is preferable that a rear surface of the expansion member 40 is coated with the same adhesive as the adhesive member 30 to thereby be continuously releasably-adhered on the cover body 10.

Figure 6:
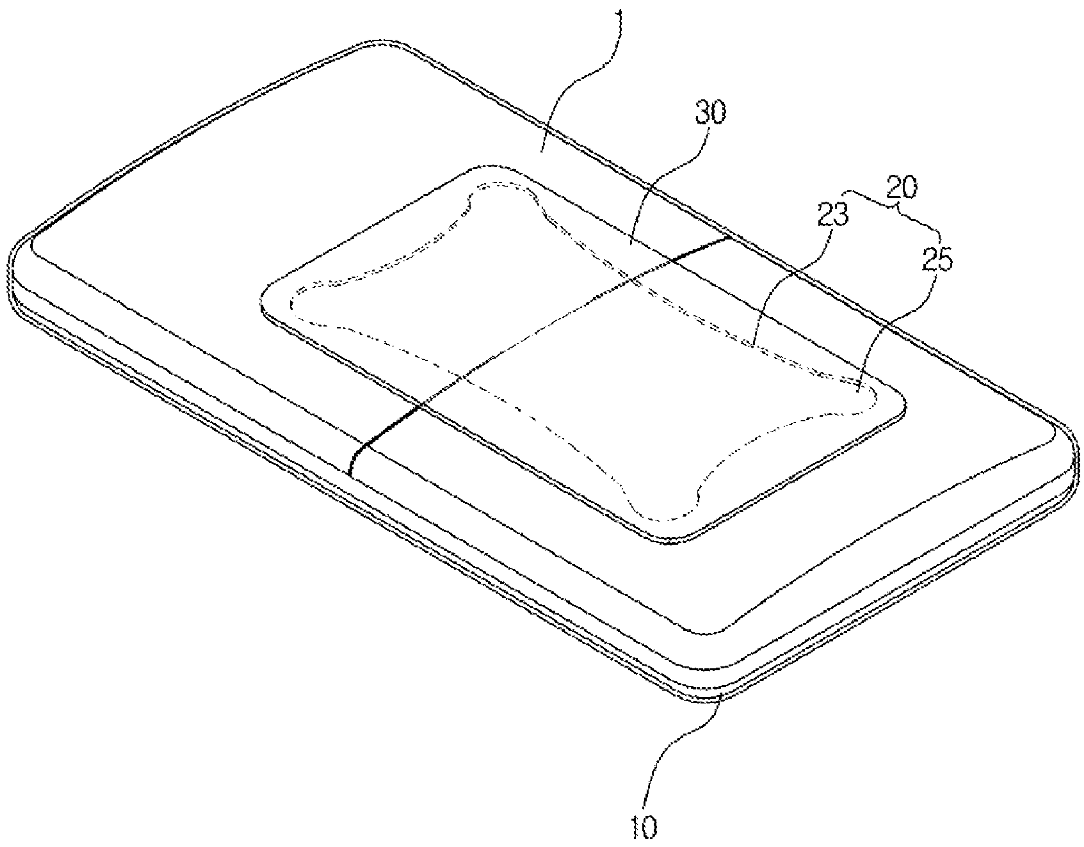
FIG. 6 is a view showing another form of a receiving hole formed on the waterproof cover according to the first preferred embodiment of the present invention.
Figure 7:
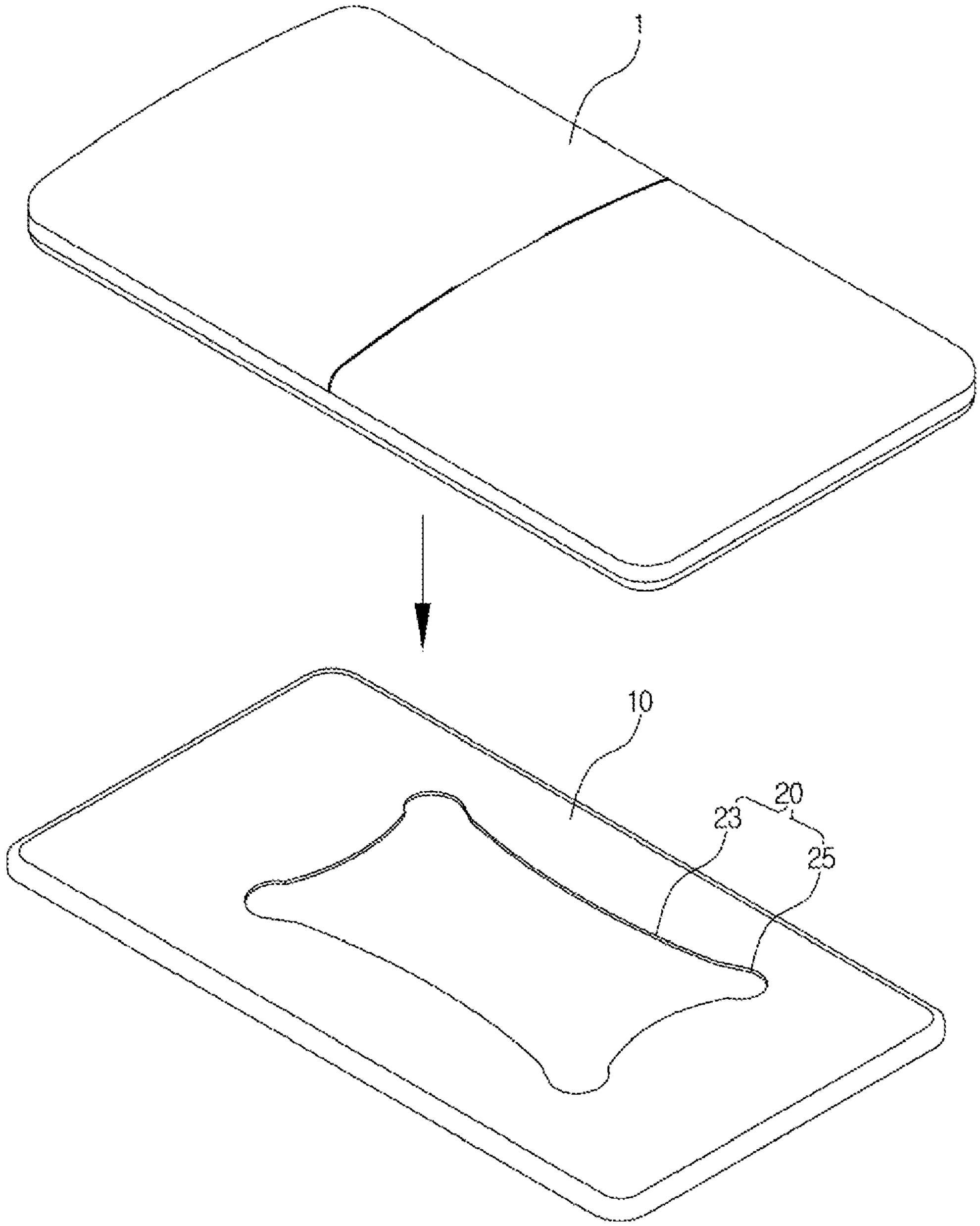
FIG. 7 is a view showing an example that the mobile phone is inserted into a further form of the receiving hole of the waterproof cover according to the first preferred embodiment of the present invention.
Figure 8:
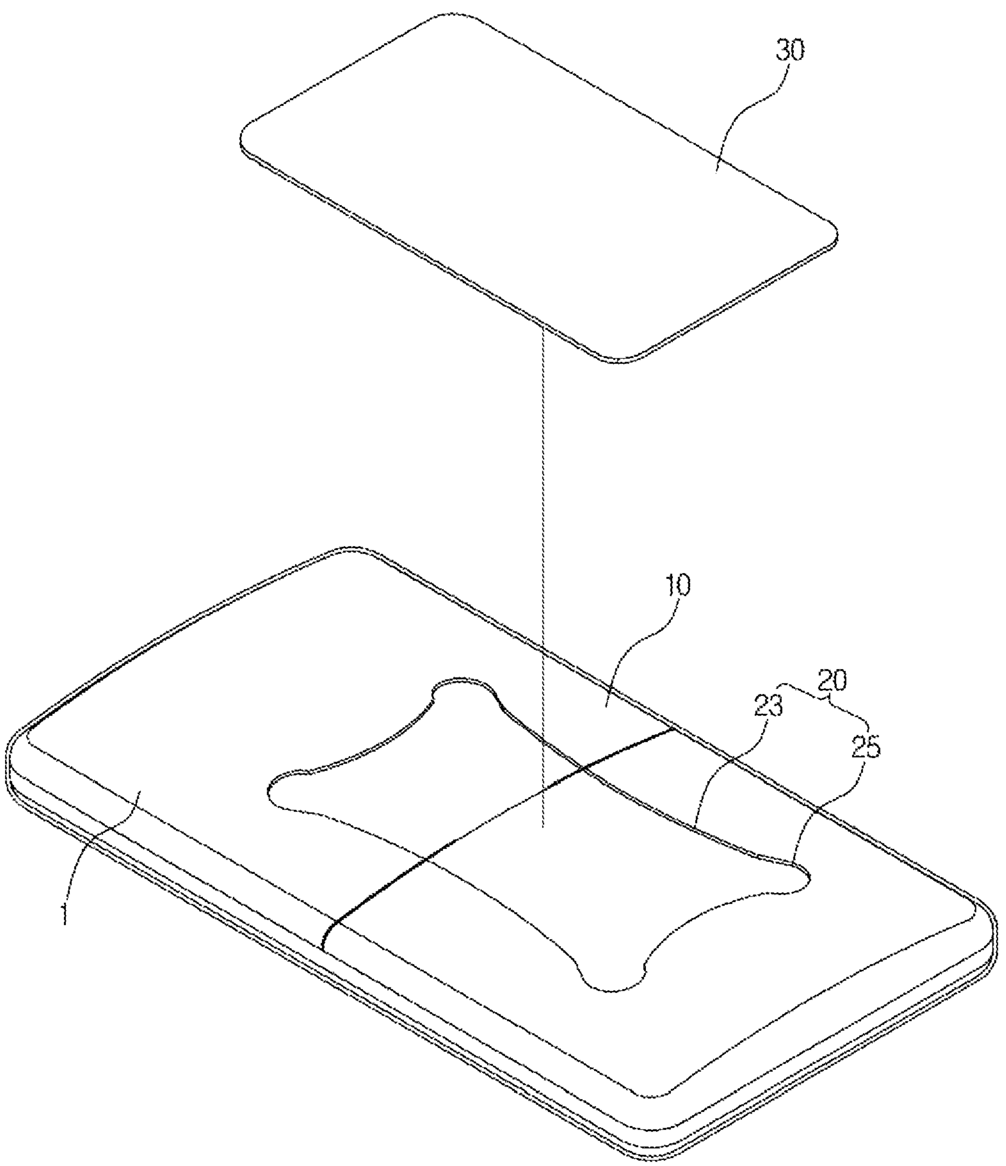
FIG. 8 is a view showing an example that the mobile phone inserted into the receiving hole of FIG. 7 is sealed by the adhesive member according to the first preferred embodiment of the present invention.

Here, as shown in FIGS. 6 to 8, the receiving hole 20 includes curved portions 23, each of which is curved inwardly, and expanded portions 25 of a round shape formed at portions where the curved portions 23 meet with each other.

Additionally, in order to insert the mobile phone 1 into the cover body 10 through the receiving hole 20, after widening a distance between the curved portions 23 of the receiving hole 20 of the cover body 10 to extend a width of the receiving hole 20, insert and push one end portion of one side of the mobile phone 1 into the expanded portion 25 of the receiving hole 20 till it is accommodated at one side of the receiving hole 20, and then, insert the other side of the mobile phone 1 into the expanded portion 25 of the other side of the receiving hole 20.

Accordingly, because the curved portions 23 are curved inwardly, an adhered area between the adhesive member 30 and the front surface of the cover body 10 is as wide as a curved form of the curved portions 23, and hence, an adhesive force between the adhesive member 30 and the cover body 10 is enhanced, so that the adhesive member 30 can seal the inside of the cover body 10 more stably. In addition, the mobile phone 1 can be easily inserted into the cover body 10 due to the expanded portions 25 expanded when a user applies power to the cover body 10 in order to insert the mobile phone 1 into the cover body 10. When the user releases the power to the cover body 10, the expanded portions 25 are restored to their original state. After that, when the adhesive member 30 is adhered onto the cover body 10 to seal the inside of the cover body 10, it can prevent the inflow of water into the cover body 10.

Here, the waterproof cover for the mobile phone according to the second preferred embodiment of the present invention includes: a cover body 110 for accommodating the mobile phone 1 therein; a transparent member 120 for allowing the mobile phone accommodated in the cover body 110 to perform its camera function; and an adhesive member 130 for sealing the cover body 110.

Figure 9:
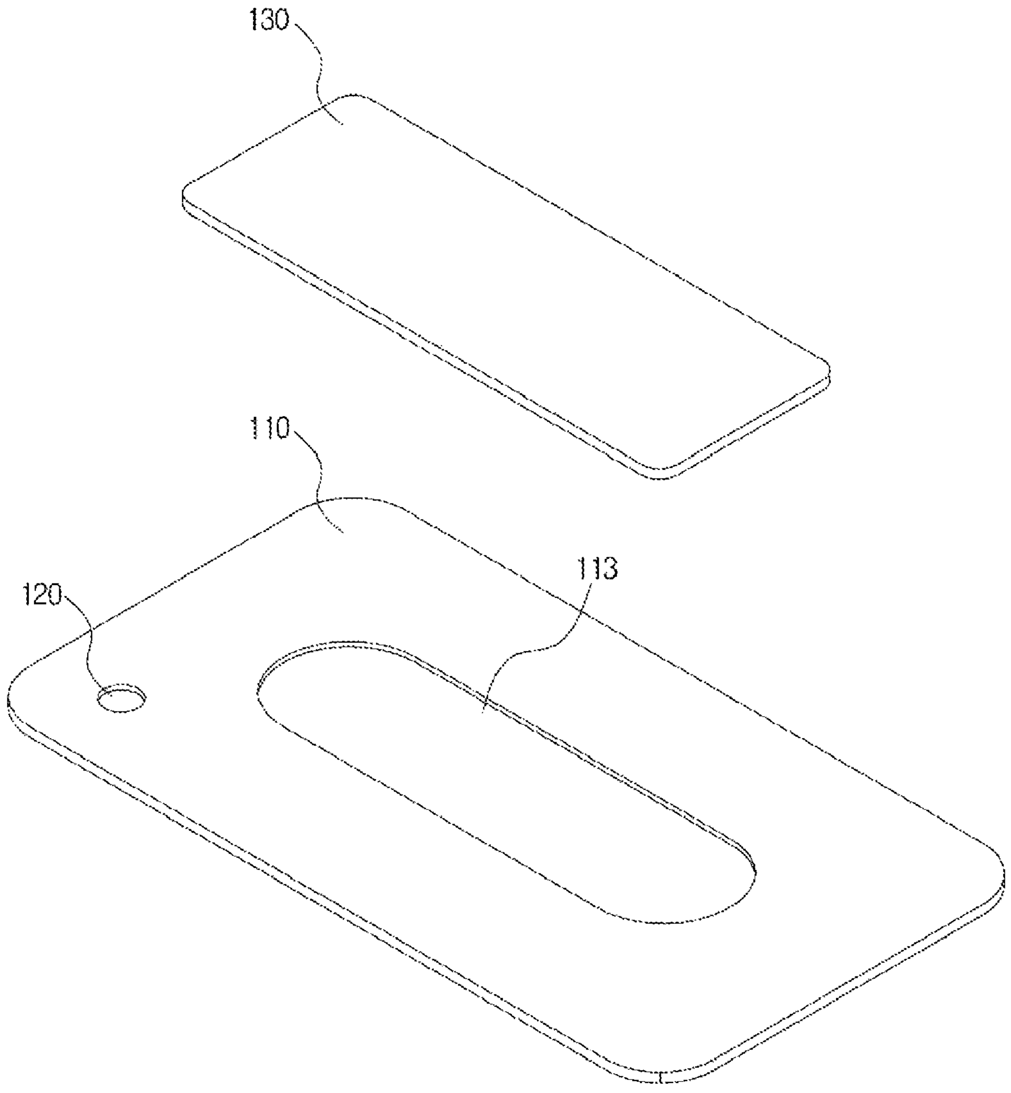
FIG. 9 is a view showing a preferable form of a waterproof cover for a mobile phone according to a second preferred embodiment of the present invention.
Figure 10:
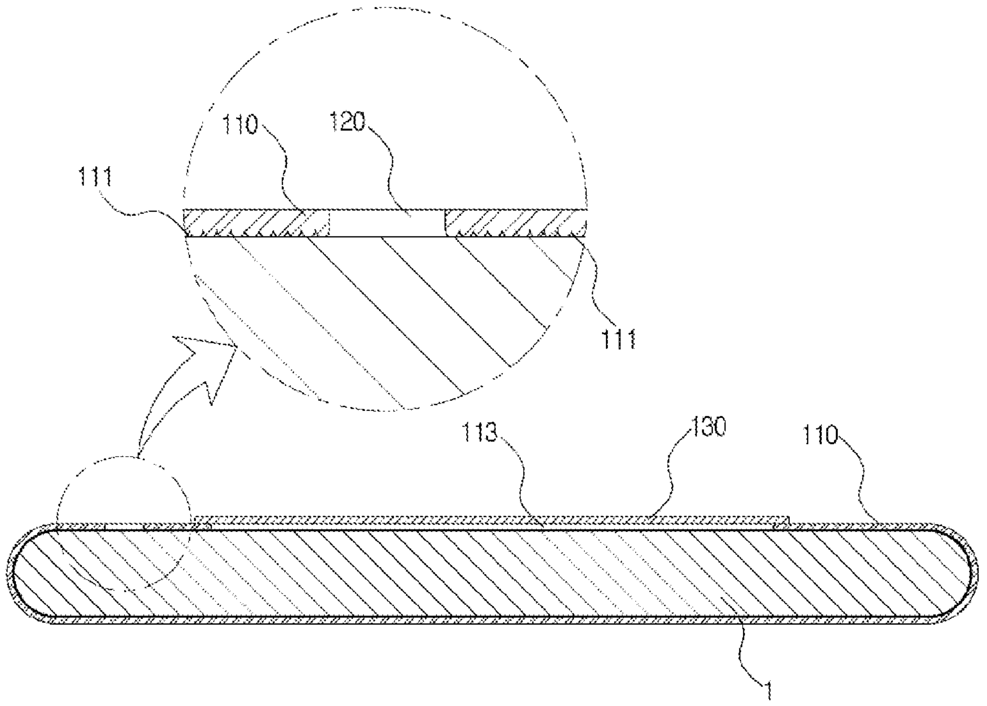
FIG. 10 is a sectional view of the waterproof cover for the mobile phone according to the second preferred embodiment of the present invention.

As shown in FIGS. 9 and 10, the cover body 110 for accommodating the mobile phone 1 therein is similar in appearance to the mobile phone 1, and includes an embossed intaglio pattern 111 to prevent that the cover body 110 sticks fast to the surface of the mobile phone 1 when the mobile phone 1 is accommodated into the cover body 110, and a receiving hole 113 formed on a front face thereof for allowing the mobile phone 1 to be inserted into or removed from the cover body 110.

The embossed intaglio pattern 111 prevents that the cover body 1 sticks fast to the mobile phone 1, but opaqueness of the embossed intaglio pattern 111 may be an obstacle to performing the camera function of the mobile phone 1 because the user cannot see an outside image, and hence, the cover body 110 has a transparent member 120 made of a transparent material for allowing a camera of the mobile phone to take the outside image through the transparent member 120. The transparent member 120 is formed at a portion of the cover body 110, where the camera of the mobile phone 110 is located, so that the camera of the mobile phone 1 can take the outside image through the transparent member 120 even though the mobile phone 1 is accommodated in the cover body 110.

The adhesive member 130 is constructed to be continuously releasably-adhered on the receiving hole 113 formed on the front face of the cover body 110 to open and close the receiving hole 113. When the adhesive member 130 is released from the cover body 110 to open the receiving hole 113, one side of the mobile phone 1 is inserted into one side of the receiving hole 113 till an end portion of the mobile phone 1 is located at an end portion of the cover body 110, and then, the other side of the mobile phone 1 is inserted into the other side of the receiving hole 113 till the other end portion of the mobile phone is located at the other end portion of the cover body 110. After that, when the mobile phone 1 is accommodated into the cover body 110, the adhesive member 130 is adhered on the receiving hole 113 to thereby seal the inside of the cover body 110.

Figure 11:
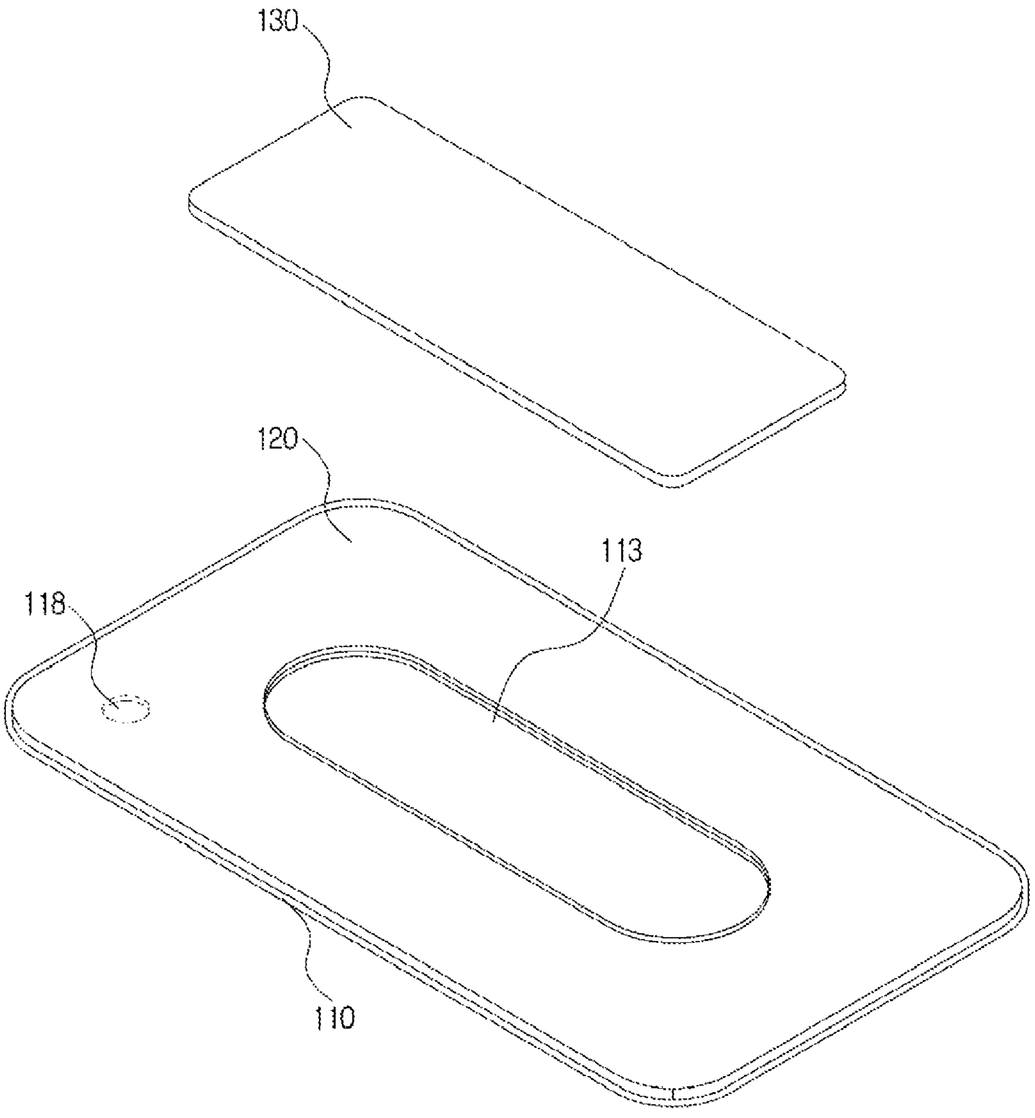
FIG. 11 is a view showing a preferable form that a transparent member and a cover body according to the second preferred embodiment of the present invention are sewed up together.
Figure 12:
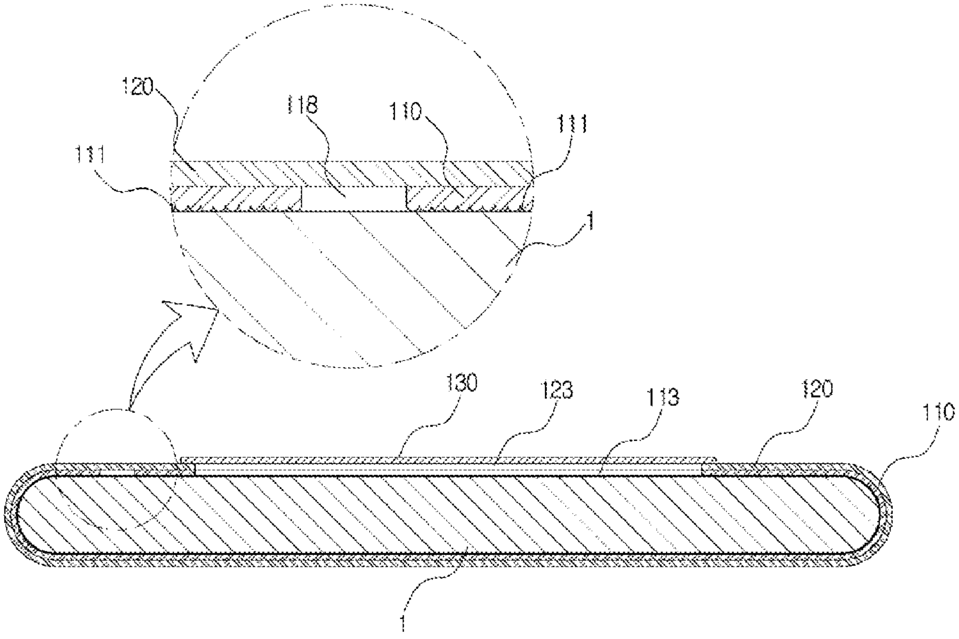
FIG. 12 is a sectional view showing the preferable form that the transparent member and the cover body according to the second preferred embodiment of the present invention are sewed up together.

Now, another form of the transparent member 120 formed on the cover body 110 according to the second preferred embodiment of the present invention will be described. As shown in FIGS. 11 and 12, the cover body 110 includes: a space for accommodating the mobile phone 1 therein; an embossed intaglio pattern 111 formed on the accommodating space; a receiving hole 114 formed on a front face of the cover body 110 for accommodating the mobile phone 1 into the cover body 110 therethrough; and a transparent member 120 formed on a front face of the cover body 110 and made of a transparent material, the transparent member 120 having the same appearance as the cover body 110 to allow insertion and removal of the mobile phone 1, the transparent member 120 having an introducing hole 123 of the same form as the receiving hole 113 of the cover body 110 and being sewed onto the cover body 110.

Moreover, the cover body 110 has a camera hole 118 formed at a portion where the camera of the mobile phone 1 accommodated in the cover body 110 is located in such a way that the camera of the mobile phone 1 can take the outside image through the camera hole 118.

Furthermore, the adhesive member 130 is releasably adhered on the upper surface of the introducing hole 123 of the transparent member 120 to open and close the introducing hole 123 of the transparent member 120.

Accordingly, the waterproof cover according to the second preferred embodiment of the present invention can allow the mobile phone to perform its camera function because the camera can take the outside image through the camera hole 118 of the cover body 110, provide a good waterproof function, and enhance practicality because the cover body 110 does not stick to the mobile phone 1 and the mobile phone 1 is easily inserted into the cover body 110 due to the embossed intaglio pattern 111.

Additionally, because the cover body 110 and the transparent member 120 are all made of polyurethane, the receiving hole 113 and the introducing hole 123 can be expanded widely and the mobile phone can be easily inserted into and removed from the waterproof cover due to flexibility of the cover body 110 and the transparent member 120.

Figure 13:
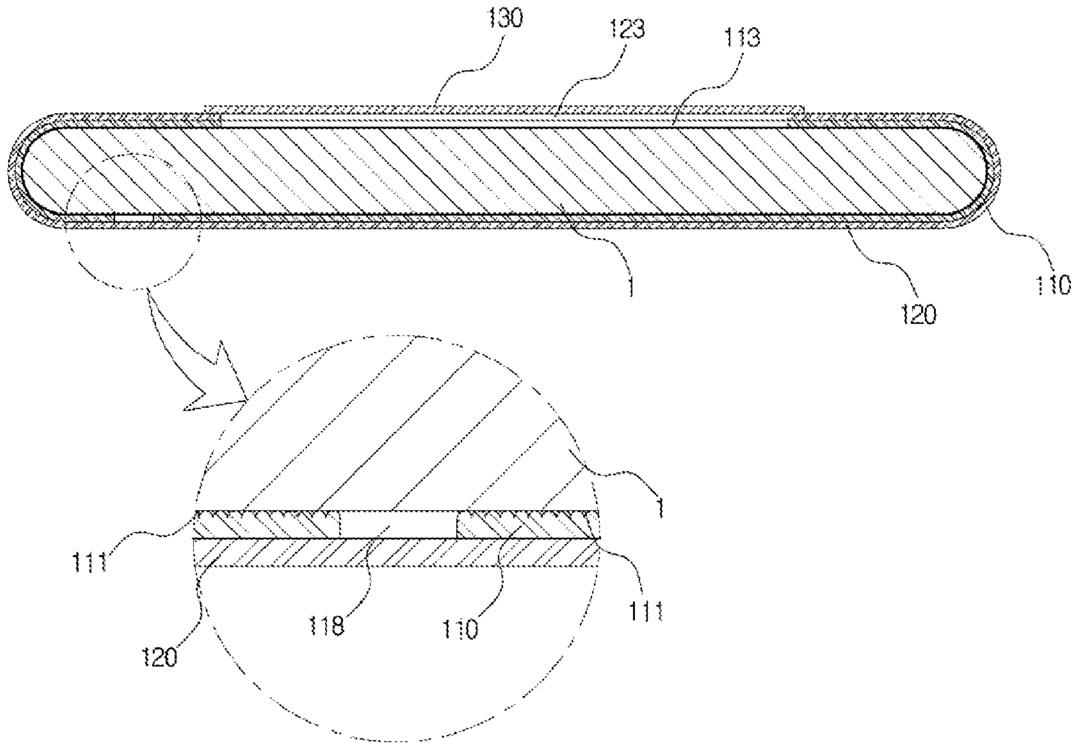
FIG. 13 is a sectional view showing that the transparent member is sewed to a lower portion of the cover body according to the second preferred embodiment of the present invention.

The camera is mounted on a front face and a rear face or one of the front face and the rear face of the mobile phone 1 according to models of mobile phones 1. For this, as shown in FIG. 13, the cover body 110 has another camera hole 118 formed at a portion where the camera of the mobile phone 1 accommodated in the cover body 110 is located and the transparent member 120, which is made of the transparent material, is sewed to the rear face of the cover body 110, so that the mobile phone can perform the camera function of the cameras mounted on the front face and the rear face of the mobile phone 1 through the camera hole 118 formed on the rear face of the cover body 110 and through the transparent member 120 sewed to the rear face of the cover body 110.

Figure 14:
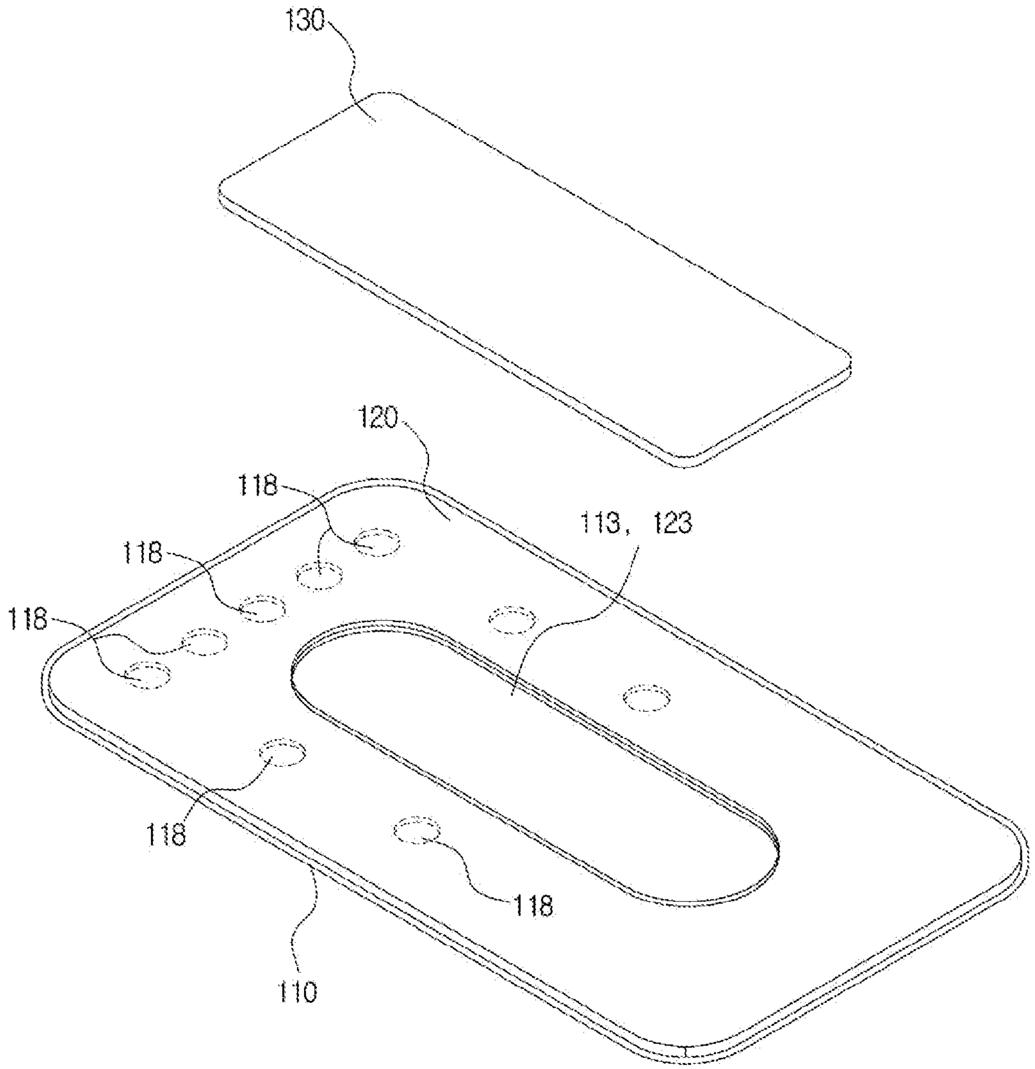
FIG. 14 is a sectional view showing that a plurality of holes are formed on the cover body according to the second preferred embodiment of the present invention.

Moreover, as shown in FIG. 14, the cover body 110 may have a plurality of camera holes 118 because the camera may change in position according to models and functions of mobile phones.

Figure 15:
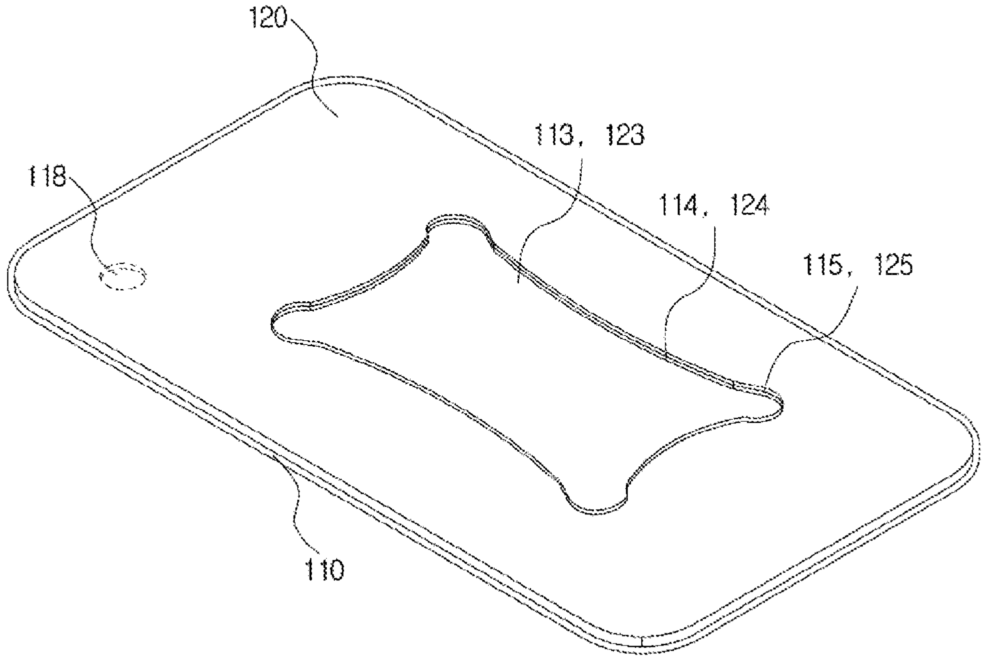
FIG. 15 is a sectional view showing a preferable form of a receiving hole of the cover body and an introducing hole of the transparent member according to the second preferred embodiment of the present invention.

As shown in FIG. 15, the cover body 110 and the transparent member 120 are sewed together, and the receiving hole 113 of the cover body 110 and the introducing hole 123 of the transparent member 120 for inserting the mobile phone 1 into the waterproof cover have the same form. The receiving hole 113 of the cover body 110 and the introducing hole 123 of the transparent member 120 respectively include: curved portions 114 and 124 curved inwardly; and expanded portions 115 and 125 of a round shape formed at portions where the curved portions 114 and 124 meet with each other.

Figure 16A:
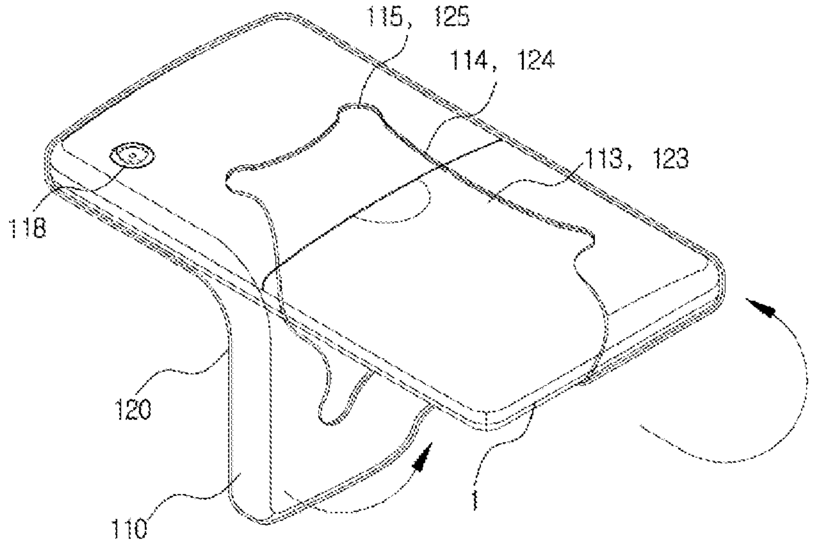
FIGS. 16*a* and 16*b* are sectional views showing that the mobile phone is accommodated in the waterproof cover through the receiving hole and the introducing hole according to the second preferred embodiment of the present invention.
Figure 16B:
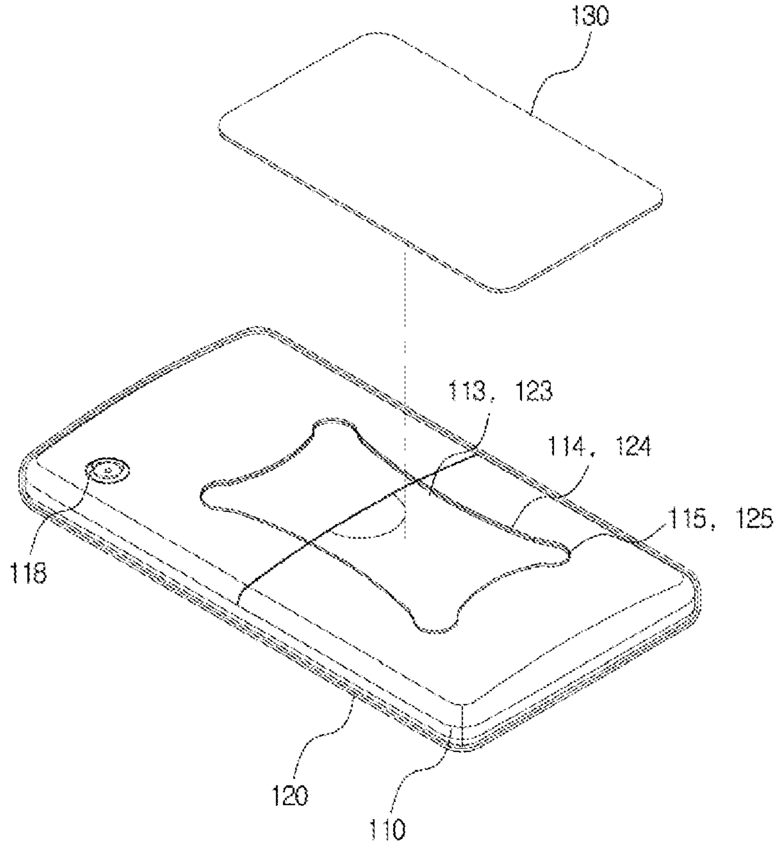

In order to accommodate the mobile phone 1 into the cover body 110 through the transparent member 120 via the receiving hole 113 and the introducing hole 123, as shown in FIGS. 16*a* and 16*b*, broaden the receiving hole 113 and the introducing hole 123 by setting the curved portions 124 of the introducing hole 123 of the transparent member 120 apart and the curved portions 114 of the receiving hole 113 of the cover body 110 apart to widen widths of the receiving hole 113 and the introducing hole 123, and insert and push the end portion of one side of the mobile phone 1 into the receiving hole 113 and the introducing hole 123 till it is accommodated into the sides of the receiving hole 113 and the introducing hole 123, and then, the other side of the mobile phone 1 is inserted into the expanded portions 115 and 125 of the other sides of the receiving hole 113 and the introducing hole 123 till the mobile phone 1 is completely accommodated into the cover body 110.

Accordingly, because the curved portions 114 and 124 are curved inwardly, an adhered area between the adhesive member 130 and the front face of the transparent member 120 is as wide as the curved form of the curved portions 114 and 124, and hence, an adhesive force between the adhesive member 130 and the cover body 110 is enhanced, so that the adhesive member 130 can seal the inside of the cover body 110 more stably. In addition, the expanded portions 115 and 125 are expanded more when the user applies power to the cover body 110 and the transparent member 120 in order to easily insert the mobile phone 1 into the cover body 110. When the user releases the power to the cover body 110 and the transparent member 120, the expanded portions 115 and 125 are restored to their original state. After that, when the adhesive member 130 is adhered onto the transparent member 120 to seal the inside of the cover body 110, it can prevent the inflow of water into the cover body 10, so that the waterproof cover can effectively perform the waterproof function of the mobile phone 1.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A waterproof cover for a mobile phone, the waterproof cover comprising a cover body, a transparent member, and an adhesive member;

the cover body having a space for accommodating a mobile phone therein, an embossed intaglio pattern for preventing the cover body from sticking fast to a surface of the mobile phone when the mobile phone is accommodated in the cover body, a plurality of camera holes formed at portions where a camera of the mobile phone accommodated in the cover body is positionable to allow the camera to take an outside image through the transparent member, and a receiving hole formed on a front face of the cover body to allow the mobile phone to be inserted into or removed from the cover body;

the transparent member being made of a transparent material and having an introducing hole of the same shape as the receiving hole of the cover body to allow the mobile phone to be inserted into and removed from the transparent member in the same way as the cover body, the transparent member being attached onto the front face of the cover body; and the adhesive member being continuously releasably-adherable over the introducing hole of the transparent member to seal and open the introducing hole;

wherein the plurality of camera holes includes a camera hole formed on a rear face of the cover body where the camera mounted on a rear face of the mobile phone accommodated in the cover body is to be located, the transparent member being attached onto the rear face of the cover body.

2. The waterproof cover according to claim 1, wherein the receiving hole of the cover body and the introducing hole of the transparent member respectively include:

curved portions curved inwardly; and expanded portions of a round shape formed at portions where the curved portions meet with each other.

* * * * *